US012523952B2

(12) United States Patent
Miyashita

(10) Patent No.: US 12,523,952 B2
(45) Date of Patent: Jan. 13, 2026

(54) FIXING DEVICE AND IMAGE PROCESSING DEVICE

(71) Applicant: Toshiba Tec Kabushiki Kaisha, Tokyo (JP)

(72) Inventor: Kousei Miyashita, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/670,501

(22) Filed: May 21, 2024

(65) Prior Publication Data

US 2024/0310764 A1 Sep. 19, 2024

Related U.S. Application Data

(63) Continuation of application No. 17/944,112, filed on Sep. 13, 2022, now Pat. No. 12,038,704.

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC ........... G03G 15/2017; G03G 15/2039; G03G 15/2042; G03G 15/2053; G03G 2215/2003
See application file for complete search history.

(56) References Cited

U.S. PATENT DOCUMENTS

| | | | | |
|---|---|---|---|---|
| 2012/0263510 A1 | 10/2012 | Mita | | |
| 2014/0138372 A1 | 5/2014 | Ogura | | |
| 2018/0181037 A1 | 6/2018 | Kataoka | | |
| 2020/0033768 A1 | 1/2020 | Furuichi | | |
| 2020/0033774 A1 | 1/2020 | Shinji | | |
| 2022/0163910 A1* | 5/2022 | Murakami | ......... | G03G 15/2053 |
| 2022/0229386 A1* | 7/2022 | Maruyama | ............. | H05B 3/141 |
| 2024/0085830 A1 | 3/2024 | Miyashita | | |

FOREIGN PATENT DOCUMENTS

| | | |
|---|---|---|
| JP | 2017097143 A | 6/2017 |
| JP | 2019091028 A | 6/2019 |

* cited by examiner

*Primary Examiner* — Thomas S Giampaolo, II
(74) *Attorney, Agent, or Firm* — Kim & Stewart LLP

(57) ABSTRACT

According to one embodiment, a fixing device includes a tubular body and a heater unit inside the tubular body. The heater unit has a longitudinal direction parallel to an axial direction of the tubular body. A first surface side of the heater unit contacts the tubular body. A heat equalizing member is on a second surface side of the heater unit. The heater unit is between the heat equalizing member and the tubular body. The heat equalizing member includes a heat transfer sheet and a protective member. A support member is configured to hold the heat equalizing member and the heater unit. The heat equalizing member is between the support member and the second surface side of the heater unit.

20 Claims, 9 Drawing Sheets

FIXING DEVICE AND IMAGE PROCESSING DEVICE

CROSS-REFERENCE TO RELATED APPLICATION

This application is a continuation of U.S. patent application Ser. No. 17/944,112, filed Sep. 13, 2022, the entire contents of which is incorporated herein by reference.

FIELD

Embodiments described herein relate generally to a fixing device and an image processing device.

BACKGROUND

An image forming device includes a fixing device that heats toner (recording agent) and fixes toner to a sheet to form a printed image. The fixing device includes a tubular body that rotates and contacts the sheet and a heater unit that heats the tubular body. The heater unit preferably prevents unevenness in the temperature distribution along the tubular bond. To this end, the fixing device typically includes a heat equalizing member to equalize the temperature distribution. The heat equalizing member is disposed along the length of heater unit. In some examples, the heat equalizing member may rub against the tubular body. In this case, the heat equalizing member may come into contact with the heater unit and a support member that supports the heat equalizing member in position and become worn over time with use.

DETAILED DESCRIPTION

Figure 1:
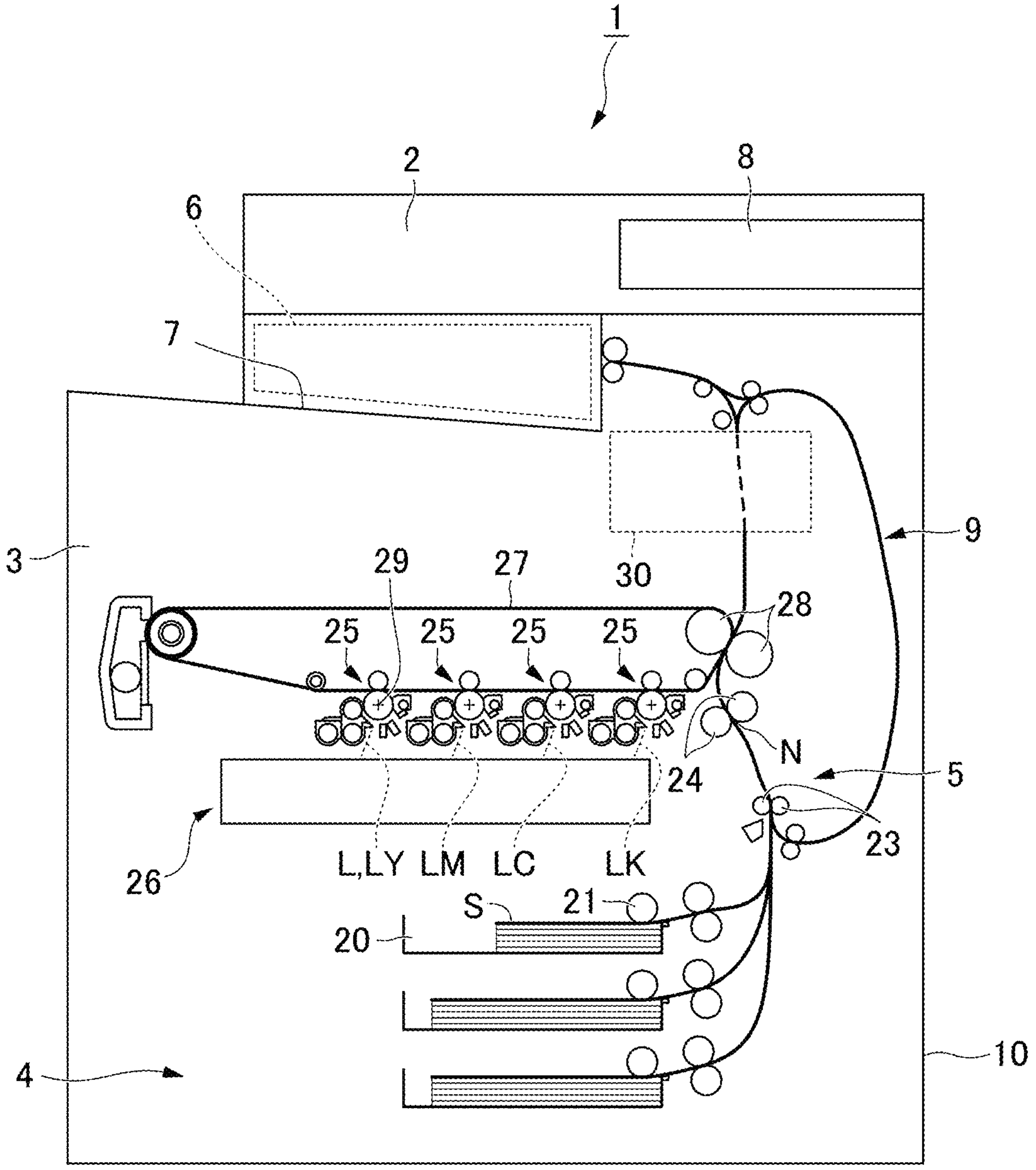
FIG. 1 illustrates an image processing device according to an embodiment.

In general, according to one embodiment, a fixing device includes a tubular body and a heater unit inside the tubular body. The heater unit has a longitudinal direction parallel to an axial direction of the tubular body. A first surface side of the heater unit contacts the tubular body. A heat equalizing member is on a second surface side of the heater unit. The heater unit is between the heat equalizing member and the tubular body. The heat equalizing member includes a heat transfer sheet and a protective member. A support member is configured to hold the heat equalizing member and the heater unit. The heat equalizing member is between the support member and the second surface side of the heater unit.

Hereinafter, a fixing device and an image processing device according to certain example embodiment will be described with reference to the drawings. In the following description, configurations having the same or substantially similar functions are denoted by the same reference numerals, and redundant description of these configurations may be omitted.

FIG. 1 illustrates a schematic configuration diagram of an image processing device 1 according to an embodiment.

The image processing device 1 according to the present embodiment is, for example, a multi-function peripheral (MFP) printer and/or a copier. For example, the image forming device 1 is provided in a workplace setting. The image forming device 1 performs a process of forming an image on a sheet S. The sheet S may be paper. The image forming device 1 includes a housing 10, a scanner unit 2, an image forming unit 3, a sheet supply unit 4, a conveyance unit 5, a paper discharge tray 7, an inversion unit 9, a control panel 8, and a control unit 6.

The housing 10 forms an outer shape of the image forming device 1.

The scanner unit 2 reads image information of an object to be copied based on brightness and darkness of light and generates an image signal. The scanner unit 2 outputs the generated image signal to the image forming unit 3.

The image forming unit 3 forms a toner image with toner based on the image signal received from the scanner unit 2 or an external device. The image forming unit 3 transfers the toner image onto a surface of the sheet S. The image forming unit 3 heats and presses the toner image on the surface of the sheet S to fix the toner image on the sheet S.

The sheet supply unit 4 supplies the sheet S one by one to the conveyance unit 5 when the image forming unit 3 forms the toner image. The sheet supply unit 4 includes a sheet accommodating portion 20 and a pickup roller 21.

The sheet accommodating portion 20 accommodates the sheet S of a predetermined size and type.

The pickup roller 21 picks up the sheets S one by one from the sheet accommodating portion 20. The pickup roller 21 supplies the sheet S picked up to the conveyance unit 5.

The conveyance unit 5 conveys the sheet S supplied from the sheet supply unit 4 to the image forming unit 3. The conveyance unit 5 includes conveyance rollers 23 and registration rollers 24.

The conveyance rollers 23 convey the sheet S supplied from the pickup roller 21 to the registration rollers 24. The conveyance rollers 23 abut a tip of the sheet S in a conveyance direction against a nip N between the registration rollers 24.

The registration rollers 24 adjust a position of the tip of the sheet S in the conveyance direction by bending the sheet S at the nip N. The registration rollers 24 convey the sheet S when the image forming unit 3 transfers the toner image to the sheet S.

The image forming unit 3 includes a plurality of image forming portions 25, a laser scanning unit 26, an intermediate transfer belt 27, transfer portions 28, and a fixing device 30.

The image forming portion 25 includes a photoreceptor drum 29. The image forming portion 25 forms, on the photoreceptor drum 29, the toner image corresponding to the image signal from the scanner unit 2 or the outside. The plurality of image forming portions 25 form the toner image with yellow, magenta, cyan, and black toner.

A charger, a developing device, and the like are disposed around the photoreceptor drum 29. The charger charges a surface of the photoreceptor drum 29. The developing device contains a developer that contains the yellow, magenta, cyan, and black toner. The developing device develops an electrostatic latent image on the photoreceptor drum 29. As a result, the photoreceptor drum 29 is formed with the toner image using the toner of each color.

The laser scanning unit 26 scans the charged photoreceptor drum 29 with a laser beam L to expose the photoreceptor drum 29. The photoreceptor drums 29 of the image forming portions 25 of all the colors are exposed with different laser beams LY, LM, LC, and LK by the laser scanning unit 26, respectively. Accordingly, the laser scanning unit 26 forms the electrostatic latent image on the photoreceptor drum 29.

The toner image on the surface of the photoreceptor drum 29 is primarily transferred onto the intermediate transfer belt 27.

The transfer portions 28 transfer, onto the surface of the sheet S at a secondary transfer position, the toner image primarily transferred onto the intermediate transfer belt 27.

The fixing device 30 heats and pressurizes the toner image transferred to the sheet S to fix the toner image on the sheet S.

The inversion unit 9 inverts the sheet S in order to form an image on a back surface of the sheet S. The inversion unit 9 inverts the sheet S discharged from the fixing device 30 upside down by switchback. The inversion unit 9 conveys the inverted sheet S toward the registration rollers 24.

The paper discharge tray 7 is placed with the discharged sheet S on which the image is formed.

The control panel 8 is a part of an input unit through which an operator inputs information for operating the image forming device 1. The control panel 8 includes a touch panel and various hard keys.

The control unit 6 controls an operation of each unit of the image forming device 1.

Figure 2:
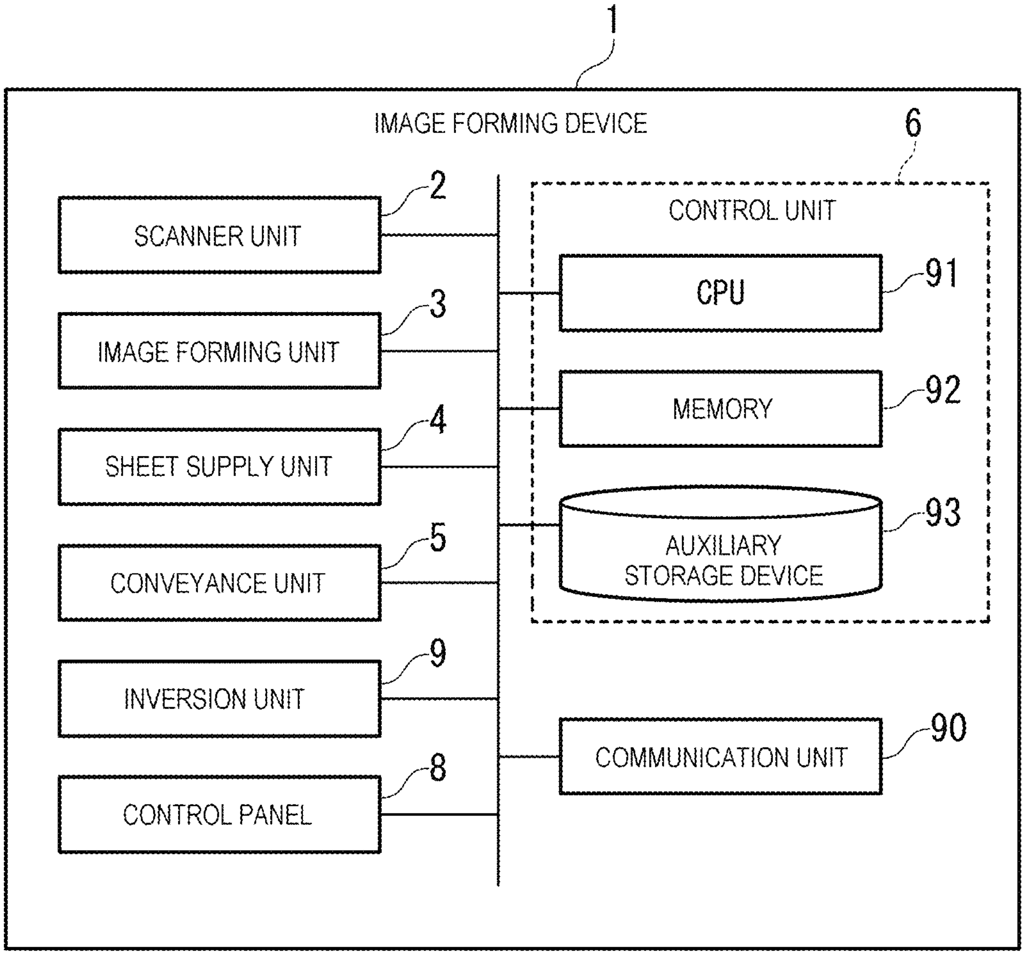
FIG. 2 illustrates a hardware configuration an image processing device.

FIG. 2 illustrates a hardware configuration diagram of the image forming device according to the embodiment.

As illustrated in FIG. 2, the image forming device 1 includes a central processing unit (CPU) 91, a memory 92, an auxiliary storage device 93, and the like, which are connected by a bus, and executes a program. The image forming device 1 functions as a device including the scanner unit 2, the image forming unit 3, the sheet supply unit 4, the conveyance unit 5, the inversion unit 9, the control panel 8, and a communication unit 90 by executing the program.

The CPU 91 functions as the control unit 6 by executing the program stored in the memory 92 and the auxiliary storage device 93. The control unit 6 controls an operation of each functional unit of the image forming device 1.

The auxiliary storage device 93 is formed by a storage device such as a magnetic hard disk device or a semiconductor storage device. The auxiliary storage device 93 stores information.

The communication unit 90 includes a communication interface that connects the own device to an external device. The communication unit 90 communicates with the external device via the communication interface.

First Embodiment

Figure 3:
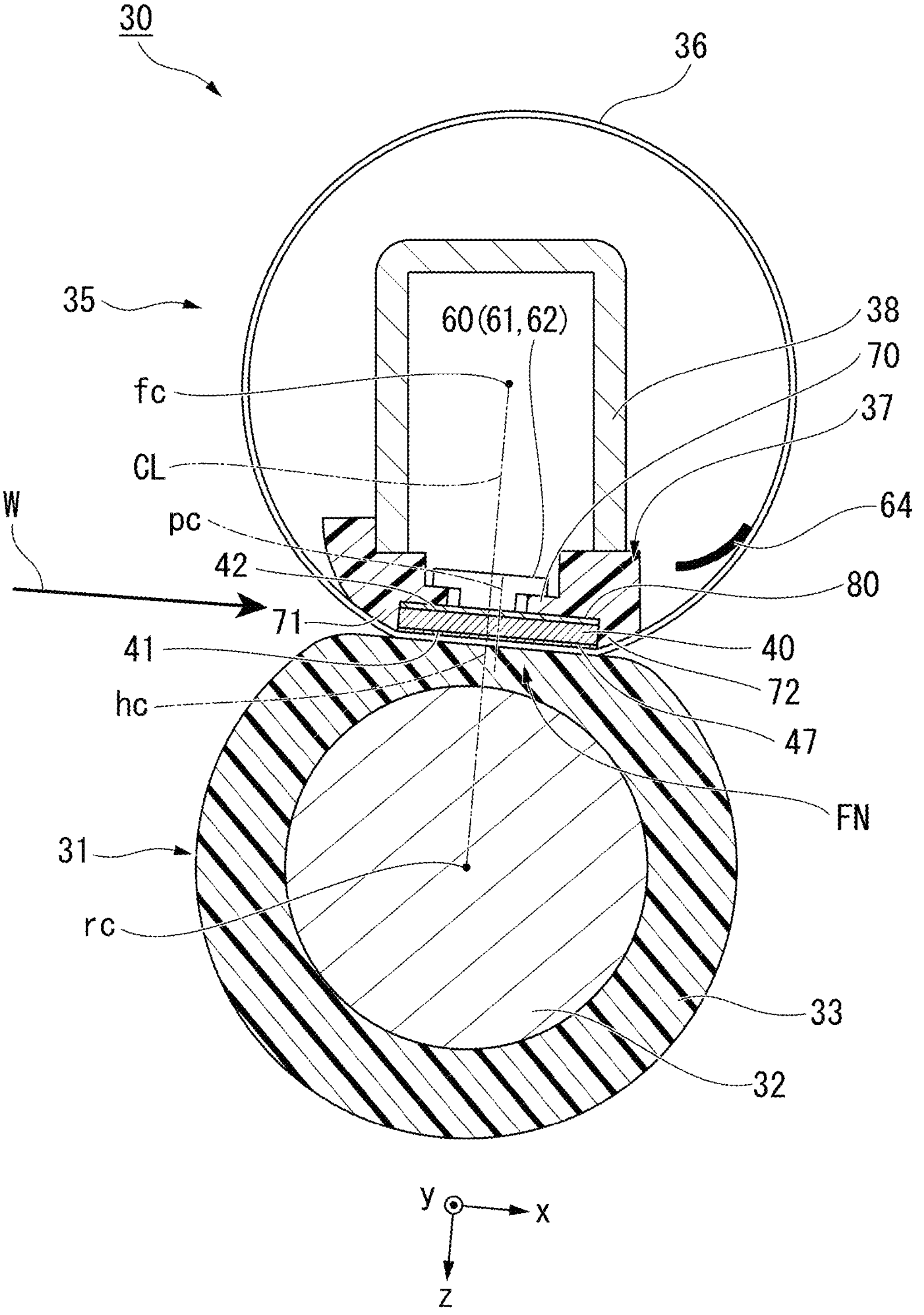
FIG. 3 illustrates a cross-sectional view of a fixing device according to a first embodiment.

FIG. 3 illustrates a cross-sectional view of a fixing device 30 according to a first embodiment.

As illustrated in FIG. 3, the fixing device 30 includes a pressure roller 31 and a film unit 35. A fixing nip FN is formed between the pressure roller 31 and the film unit 35. The pressure roller 31 pressurizes the toner image on the sheet S that entered the fixing nip FN. The pressure roller 31 rotates to convey the sheet S. The film unit 35 heats the toner image on the sheet S that entered the fixing nip FN.

In the present application, a z direction, an x direction, and a y direction are defined as follows. The z direction is a direction in which the pressure roller 31 and the film unit 35 are arranged. A +z direction is a direction from the film unit 35 toward the pressure roller 31. The x direction is the conveyance direction of the sheet S at the fixing nip FN, and a +x direction is a downstream side in the conveyance direction of the sheet S. The y direction is a direction orthogonal to the z direction and the x direction, and is an axial direction of the pressure roller 31.

The pressure roller 31 includes a core metal 32, an elastic layer 33, and a release layer.

The core metal 32 is formed in a columnar shape by a metal material such as stainless steel. Both end portions of the core metal 32 in an axial direction are rotatably supported. The core metal 32 is rotationally driven by a motor. The core metal 32 is in contact with a cam member. The cam member rotates to bring the core metal 32 closer to and away from the film unit 35.

The elastic layer 33 is formed of an elastic material such as silicone rubber. The elastic layer 33 is formed on an outer peripheral surface of the core metal 32 with a constant thickness.

The release layer is formed of a resin material such as a tetrafluoroethylene-perfluoroalkyl vinyl ether copolymer (PFA). The release layer is formed on an outer peripheral surface of the elastic layer 33.

Hardness of an outer peripheral surface of the pressure roller 31 is preferably 40° to 70° under a load of 9.8 N as measured by an ASKER-C hardness meter. Accordingly, an area of the fixing nip FN and durability of the pressure roller 31 are ensured.

The pressure roller 31 can approach and be separated from the film unit 35 by the rotation of the cam member. When the pressure roller 31 approaches the film unit 35 and is pressed by a pressure spring, the fixing nip FN is formed. On the other hand, when the sheet S is jammed in the fixing device 30, the sheet S can be removed by separating the pressure roller 31 from the film unit 35. By separating the pressure roller 31 from the film unit 35 in a state where a tubular body 36 stops rotating, such as during sleep, plastic deformation of the tubular body 36 is prevented.

The pressure roller 31 is rotationally driven by the motor to rotate. When the pressure roller 31 rotates in a state where the fixing nip FN is formed, the tubular body 36 of the film unit 35 is driven to rotate. The pressure roller 31 rotates in a state where the sheet S is disposed at the fixing nip FN, whereby the sheet S is conveyed in a conveyance direction W.

The film unit 35 includes the tubular body 36, a heater unit 40, a heat equalizing member 80, a support member 37, a stay 38, a temperature sensitive element 60, and film thermometers 64.

The tubular body 36 is a fixing belt. The tubular body 36 is a tubular film extending along the y direction. The tubular body 36 includes a base layer, an elastic layer, and a release layer in this order from an inner peripheral side. The base layer is formed in a tubular shape by a material such as polyimide. The elastic layer is laminated and disposed on an outer peripheral surface of the base layer. The elastic layer is formed of an elastic material such as silicone rubber. The release layer is laminated and disposed on an outer peripheral surface of the elastic layer. The release layer is formed of a material such as a PFA resin.

The heater unit 40 is located inside the tubular body 36. The heater unit 40 is formed in a rectangular plate shape having a longitudinal direction in the y direction and a lateral direction in the x direction. In the x direction and the y direction, a direction approaching a center of the heater unit 40 may be referred to as an inner side, and a direction away from the center of the heater unit 40 may be referred to as an outer side. The heater unit 40 includes a first surface 41 in the +z direction and a second surface 42 facing a side opposite to the first surface 41. The first surface 41 of the heater unit 40 heats the tubular body 36. The first surface 41 is in contact with an inner surface of the tubular body 36 via grease 47.

Figure 4:
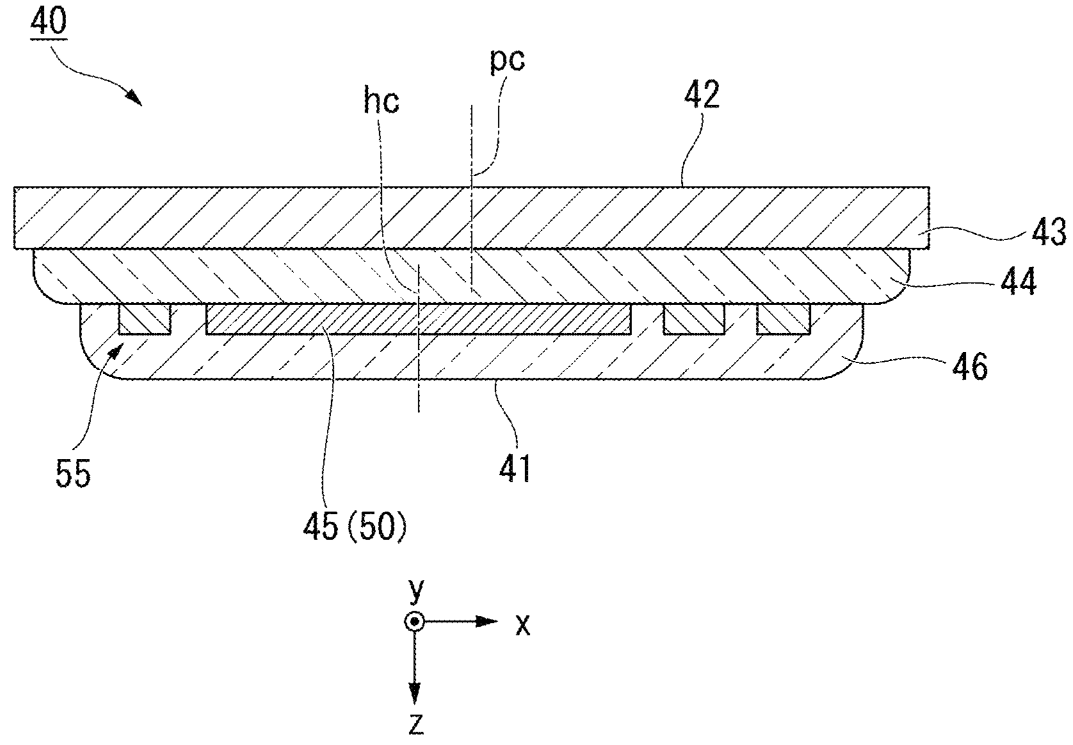
FIG. 4 illustrates a cross-sectional view of a heater unit.
Figure 5:
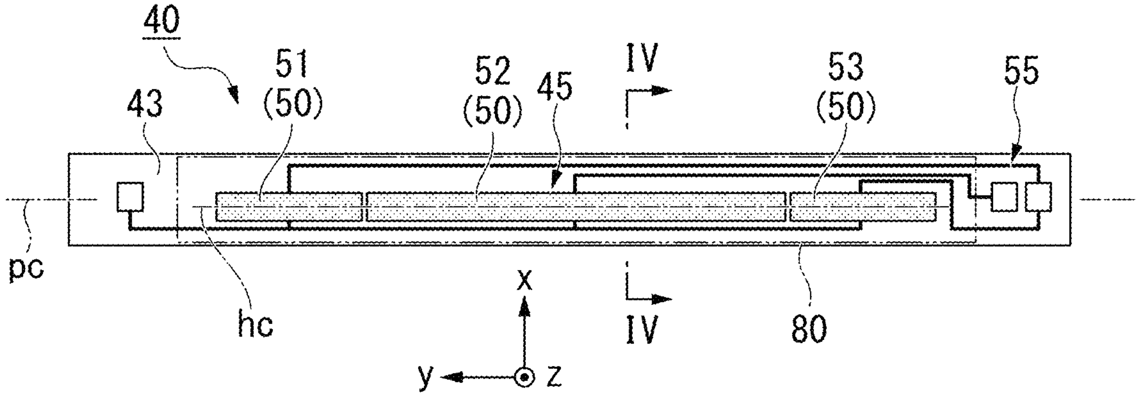
FIG. 5 illustrates a bottom view of a heater unit.

FIG. 4 illustrates a cross-sectional view of the heater unit taken along a line IV-IV in FIG. 5. FIG. 5 illustrates a bottom view (viewed from the +z direction) of the heater unit according to the first embodiment.

As illustrated in FIGS. 4 and 5, the heater unit 40 includes a substrate 43, a heating element set 45, and a wiring set 55.

The substrate 43 is formed of a metal material such as stainless steel, a ceramic material such as aluminum nitride, or the like. The substrate 43 has a rectangular plate shape having a longitudinal direction in the y direction and a lateral direction in the x direction. An insulating layer 44 formed of a glass material or the like is formed on a surface of the substrate 43 in the +z direction. A surface of the substrate 43 in a −z direction is the second surface 42 of the heater unit 40. The second surface 42 of the heater unit 40 is formed in a planar shape orthogonal to the z direction.

As illustrated in FIG. 5, the heating element set 45 is disposed on the substrate 43. The heating element set 45 includes at least one heating element 50. The heating element 50 is formed by disposing a material such as a silver-palladium alloy on the substrate 43 by screen printing. An outer shape of the entire heating element set 45 is formed in a rectangular shape having a longitudinal direction in the y direction and a lateral direction in the x direction. A center hc of the heating element set 45 in the x direction is disposed in a −x direction with respect to a center pc of the substrate 43 in the x direction.

The heating element set 45 includes a plurality of heating elements 50. The plurality of heating elements 50 include a first end heating element 51, a central heating element 52, and a second end heating element 53, which are arranged side by side in the y direction. The central heating element 52 is disposed at a central portion of the heating element set 45 in the y direction. The central heating element 52 may be configured by combining a plurality of small heating elements arranged in the y direction. The first end heating element 51 is disposed in a +y direction of the central heating element 52 and at an end portion of the heating element set 45 in the +y direction. The second end heating element 53 is disposed in a −y direction of the central heating element 52 and at an end portion of the heating element set 45 in the −y direction.

Wiring of the wiring set 55 is connected to each of the heating elements 50. The heating element set 45 generates heat by being energized via the wiring set 55. The sheet S having a small width in the y direction passes through a central portion of the fixing device 30 in the y direction. In this case, the control unit 6 causes only the central heating element 52 located on an inner side among the plurality of heating elements 50 to generate heat. On the other hand, in the case of the sheet S having a large width in the y direction, the control unit 6 causes all the heating elements 50 to generate heat.

As illustrated in FIG. 4, the heating element set 45 and the wiring set 55 are formed on a surface of the insulating layer 44 in the +z direction. A protective layer 46 is formed of a glass material or the like so as to cover the heating element set 45 and the wiring set 55. The protective layer 46 forms the first surface 41 of the heater unit 40. When the heater unit 40 generates heat, viscosity of the grease 47 between the protective layer 46 and the tubular body 36 decreases, so that slidability between the heater unit 40 and the tubular body 36 is ensured.

Similarly to the insulating layer 44 formed in the +z direction of the substrate 43, the insulating layer 44 may be formed in the −z direction of the substrate 43. Similarly to the protective layer 46 formed in the +z direction of the substrate 43, the protective layer 46 may be formed in the −z direction of the substrate 43. Accordingly, warpage of the substrate 43 is prevented.

As illustrated in FIG. 3, a straight line CL connecting a center rc of the pressure roller 31 and a center fc of the film unit 35 is defined. The center pc of the substrate 43 in the x direction is disposed in the +x direction with respect to the straight line CL. The center hc of the heating element set 45 in the x direction is disposed on the straight line CL. The entire heating element set 45 is located in a region of the fixing nip FN and disposed at a center of the fixing nip FN. Accordingly, heat distribution in the fixing nip FN is uniform, and the sheet S passing through the fixing nip FN is uniformly heated.

The heat equalizing member 80 overlaps with the heater unit 40. The heat equalizing member 80 has a rectangular plate shape corresponding to an outer shape of the substrate 43 of the heater unit 40. The heat equalizing member 80 overlaps with all the heating elements 50 in a plan view viewed from the z direction (see FIG. 5). The heat equalizing member 80 is in contact with at least a part of the second surface 42 of the heater unit 40. The heat equalizing member 80 equalizes temperature distribution of the heater unit 40.

The support member 37 is formed of a resin material such as a liquid crystal polymer. The support member 37 has a length in the y direction. The support member 37 is disposed in a manner of covering a side of the heater unit 40 in the −z direction and both sides of the heater unit 40 in the x direction. The support member 37 holds the heater unit 40 via the heat equalizing member 80. Round chamfers are formed at both end portions of the support member 37 in the x direction. The support member 37 supports an inner peripheral surface of the tubular body 36 at both end portions of the heater unit 40 in the x direction.

The support member 37 includes a base portion 70, an upstream side wall portion 71, and a downstream side wall portion 72. The base portion 70 supports the heater unit 40 from a second surface 42 side. The upstream side wall portion 71 protrudes from an end portion of the base portion 70 in the −x direction toward a pressure roller 31 side. The downstream side wall portion 72 protrudes from an end portion of the base portion 70 in the +x direction toward the pressure roller 31 side. The heater unit 40 is disposed between the upstream side wall portion 71 and the downstream side wall portion 72. End edges of the upstream side wall portion 71 and the downstream side wall portion 72 in the +z direction extend in the y direction. The end edges of the upstream side wall portion 71 and the downstream side wall portion 72 in the +z direction are located at substantially the same position as the first surface 41 of the heater unit 40 in the z direction.

The stay 38 is formed of a steel plate material or the like. The stay 38 has a length in the y direction. A cross section of the stay 38 perpendicular to the y direction is U-shaped. The stay 38 is attached in a −z direction of the support member 37 such that a U-shaped opening is closed by the base portion 70 of the support member 37. Both end portions of the stay 38 in the y direction are fixed to the housing 10 of the image forming device 1. Accordingly, the film unit 35 is supported by the image forming device 1. The stay 38 improves bending rigidity of the film unit 35.

The temperature sensitive element 60 is disposed in a −z direction of the heater unit 40. The temperature sensitive element 60 is in contact with a surface of the heat equalizing member 80 in the −z direction. The temperature sensitive element 60 is disposed inside a hole penetrating the base portion 70 of the support member 37 in the z direction. Wiring of the temperature sensitive element 60 is drawn out from the hole of the support member 37 in the −z direction. The temperature sensitive element 60 includes a heater thermometer 61 and a thermostat 62. For example, the heater thermometer 61 is a thermistor.

Figure 6:
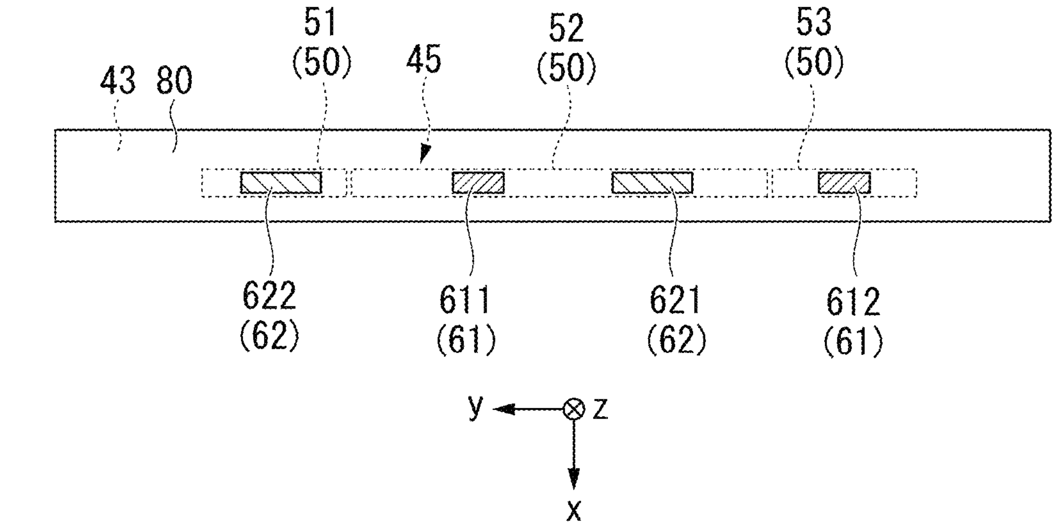
FIG. 6 illustrates a plan view of a heater thermometer and a thermostat.

FIG. 6 illustrates a plan view (viewed from the −z direction) of the heater thermometer and the thermostat according to the first embodiment. In FIG. 6, a depiction of the support member 37 is omitted.

As illustrated in FIG. 6, the heater thermometer 61 includes a central heater thermometer 611 and an end heater thermometer 612. The thermostat 62 includes a central thermostat 621 and an end thermostat 622. The central heater thermometer 611 and the central thermostat 621 are disposed in a −z direction of the central heating element 52. On the other hand, the end heater thermometer 612 and the end thermostat 622 are disposed in −z directions of the first end heating element 51 and the second end heating element 53, respectively.

The heater thermometer 61 detects a temperature of the heater unit 40 via the heat equalizing member 80.

The control unit 6 (see FIG. 1) measures a temperature of the heating element set 45 by the heater thermometer 61 when the fixing device 30 is started. When the temperature of the heating element set 45 is lower than a predetermined temperature, the control unit 6 causes the heating element set 45 to generate heat for a short time. Thereafter, the control unit 6 starts the rotation of the pressure roller 31. Due to the heat generation of the heating element set 45, the viscosity of the grease 47 applied to the inner peripheral surface of the tubular body 36 decreases. Accordingly, the slidability between the heater unit 40 and the tubular body 36 at the start of the rotation of the pressure roller 31 is ensured.

The heater thermometer 61 detects a temperature of the heat equalizing member 80.

The control unit 6 measures the temperature of the heat equalizing member 80 by the heater thermometer 61 during operation of the fixing device 30. The control unit 6 controls the energization of the heating element set 45 based on a temperature measurement result of the heat equalizing member 80. Accordingly, the temperature of the heat equalizing member 80 in contact with the support member 37 is maintained at a temperature lower than a heat resistant temperature of the support member 37.

When the temperature of the heater unit 40 detected via the heat equalizing member 80 exceeds a predetermined temperature, the thermostat 62 cuts off the energization of the heating element set 45. As a result, excessive heating of the tubular body 36 by the heater unit 40 is prevented.

As illustrated in FIG. 3, the film thermometers 64 are in contact with an inner peripheral surface of a part of the tubular body 36. The film thermometers 64 are arranged at intervals in the y direction. The film thermometers 64 detect temperatures of different portions of the tubular body 36 in the y direction.

During the operation of the fixing device 30, the control unit 6 measures the temperature of each portion of the tubular body 36 in the y direction by the film thermometers 64. The control unit 6 controls the energization of the heating element set 45 based on a temperature measurement result of each portion of the tubular body 36 in the y direction.

Figure 7:
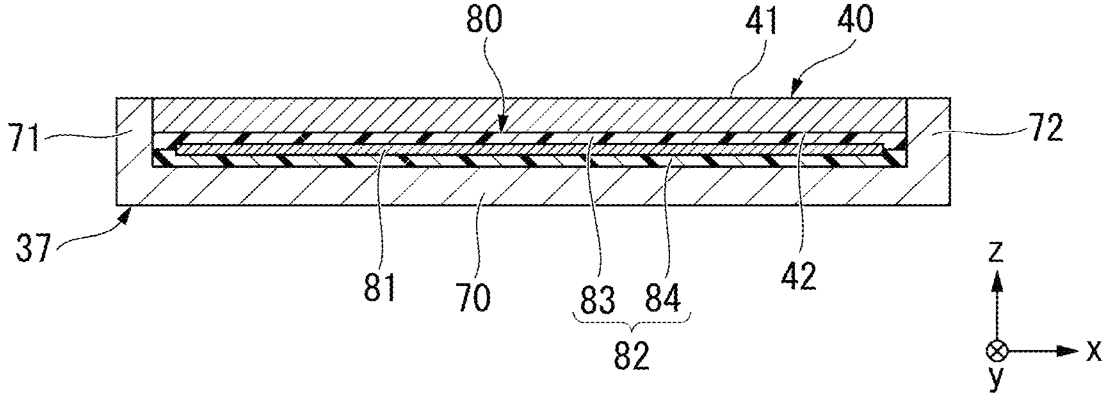
FIG. 7 is a cross-sectional view illustrating a part of a film unit.
Figure 8:
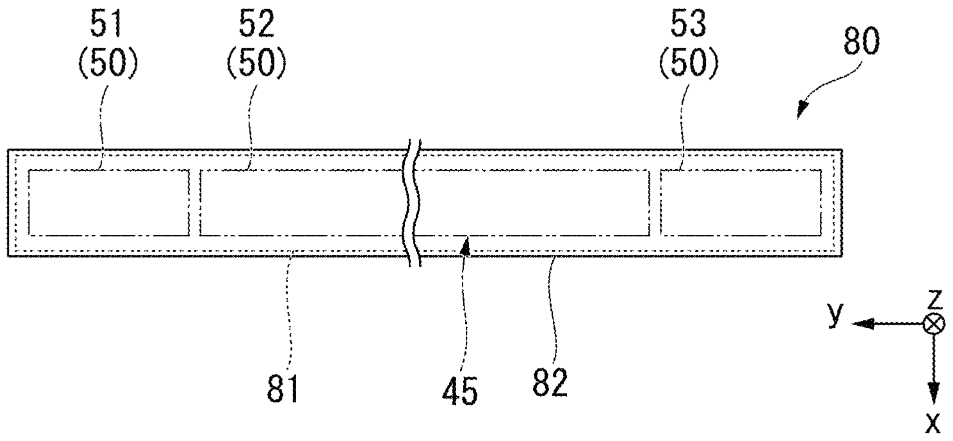
FIG. 8 illustrates a plan view of a heat equalizing member.

FIG. 7 is a cross-sectional view showing a part of the film unit 35 according to the first embodiment. FIG. 8 illustrates a plan view of the heat equalizing member 80 according to the first embodiment. In FIG. 7, depictions of the stay 38 and the tubular body 36 are omitted. In FIG. 8, a position of the heating element set 45 with respect to the heat equalizing member 80 is indicated by a dot-dash line.

The heat equalizing member 80 is formed of a flexible sheet material. The heat equalizing member 80 includes a heat transfer sheet 81 and a protective member 82. The heat transfer sheet 81 is formed of a material having thermal conductivity higher than that of the substrate 43 of the heater unit 40. The heat transfer sheet 81 can be a graphite sheet in some examples. The thickness direction of the heat transfer sheet 81 is along the z direction. The heat transfer sheet 81 has a rectangular shape having a longitudinal direction in the y direction and a lateral direction in the x direction. Both outer edges of the heat transfer sheet 81 along the y direction are located outward in the x direction from the edges of the heating element set 45. Similarly, both ends of the heat transfer sheet 81 in the y direction are located outwardly in the y direction from the y-direction ends of the heating element set 45. The heat transfer sheet 81 overlaps with the heating element set 45 in plan view.

The protective member 82 covers the heat transfer sheet 81. The protective member 82 is fixed to the heat transfer sheet 81. In general, the protective member 82 is a thin film coating covering the outer surfaces of the heat transfer sheet 81. The protective member 82 is formed of a material having a sliding resistance that is higher than that of the heat transfer sheet 81. In this context, "sliding resistance" corresponds to having a higher friction outer surface such that sliding movements along the outer surface of the material are less likely to occur. The protective member 82 is formed of a material having a thermal conductivity lower than that of the heat transfer sheet 81 but has a melting point higher than that of the support member 37. For example, the protective member 82 is formed of a polyimide resin, a fluorine resin, or the like.

The protective member 82 covers the entire surface of the heat transfer sheet 81. The entire surface includes front and back surfaces and end surfaces. An outer shape of the protective member 82 is a rectangular shape larger in the x direction and the y direction than the heat transfer sheet 81 in the plan view. The protective member 82 is larger on both sides in the x direction and on both sides in the y direction in the plan view than the heat transfer sheet 81. The end edges of the heat equalizing member 80 are formed by the protective member 82.

The protective member 82 can be considered to include a first sheet 83 covering the heat transfer sheet 81 from the +z direction and a second sheet 84 covering the heat transfer sheet 81 from the −z direction. The first sheet 83 and the second sheet 84 have the same shape and the same size in the plan view. The first sheet 83 and the second sheet 84 are disposed coincident with each other in the plan view. The first sheet 83 and the second sheet 84 can be portions of heat resistant tape or the like. The first sheet 83 is interposed between the heat transfer sheet 81 and the substrate 43. The first sheet 83 is adhered to a surface of the heat transfer sheet 81 on the +z direction side. The second sheet 84 is interposed between the heat transfer sheet 81 and the support member 37. The second sheet 84 is adhered to a surface of the heat transfer sheet 81 on the −z direction side. The first sheet 83 and the second sheet 84 respectively protrude outward from the heat transfer sheet 81 over an entire perimeter of the heat transfer sheet 81 in the plan view. The first sheet 83 and the second sheet 84 are joined (adhered) to each other on outside the perimeter of the heat transfer sheet 81. However, in some examples, the protective member 82 may be formed by folding one sheet (one piece of adhesive tape or the like) back upon itself. In this case, a fold line of the sheet may be aligned with the end edges of the heat transfer sheet 81.

When the sheet S passing through the fixing device 30 is heated, a temperature variation occurs within the heater unit 40 according to a size of the sheet S that passes. In the present embodiment, the heater unit 40 includes the first surface 41 that heats the tubular body 36 and the second surface 42 that faces the side opposite to the first surface 41. The heat equalizing member 80 is in contact with the second surface 42 of the heater unit 40. The heat equalizing member 80 in this example includes the heat transfer sheet 81 having a thermal conductivity higher than that of the substrate 43 of the heater unit 40 along with the protective member 82 covering the heat transfer sheet 81. According to the above configuration, the heat equalizing member 80 can help equalize spatial temperature variations in the heater unit 40 by heat conduction via the heat transfer sheet 81.

When the tubular body 36 rotates during the conveyance of the sheet S, a force is applied to the heat equalizing member 80 via the heater unit 40. The heat equalizing member 80 may be moved or vibrated by the rotation of the tubular body 36. However, since the heat equalizing member 80 includes the protective member 82 covering the heat transfer sheet 81, the heat transfer sheet 81 coming into contact with the support member 37 can be prevented. Therefore, even when the heat equalizing member 80 is moved by the rotation of the tubular body 36, the heat transfer sheet 81 can be prevented from coming into direct contact with the support member 37 and being worn.

The protective member 82 covers the entire outer surface of the heat transfer sheet 81. With this configuration, since the heat transfer sheet 81 is not exposed at an outer surface of the heat equalizing member 80, direct contact between the heat transfer sheet 81 with the support member 37 is eliminated. Therefore, the heat transfer sheet 81 can be reliably prevented from become worn.

In particular, since the protective member 82 covers the end edges of the heat transfer sheet 81, it is possible to effectively prevent the end edges of the heat transfer sheet 81 from hitting the support member 37 and being damaged.

Since the protective member 82 is a heat resistant tape, any possible decrease in heat resistance of the fixing device 30 due to the provision of the protective member 82 can be avoided.

The protective member 82 is located between the heat transfer sheet 81 and the support member 37 and has thermal conductivity lower than that of the heat transfer sheet 81. Accordingly, the heat conduction from the heat transfer sheet 81 to the support member 37 can be inhibited. Accordingly, breakage caused by a temperature rise of the support member 37 when a temperature of the heat transfer sheet 81 becomes high can be prevented.

The protective member 82 provides a higher friction outer surface than that of the heat transfer sheet 81 (which is a graphite sheet in this example). Accordingly, in addition to preventing the direct wear of the heat transfer sheet 81, the protective member 82 is also less likely to move in response to rotations of the tubular body 36 and come into contact with the support member 37 and thus less likely to become worn by repeated movements.

In some examples, the protective member 82 need not be a tape adhered to the outer surface(s) of the heat transfer sheet 81. For example, the protective member may be fixed to the heat transfer sheet 81 by an adhesion or bonding process using an adhesive, welding, or the like. The protective member 82 need not be directly fixed to the heat transfer sheet 81. For example, the heat transfer sheet 81 may be accommodated inside a bag-like protective member 82 without any direct fixation process between the two components.

Second Embodiment

Figure 9:
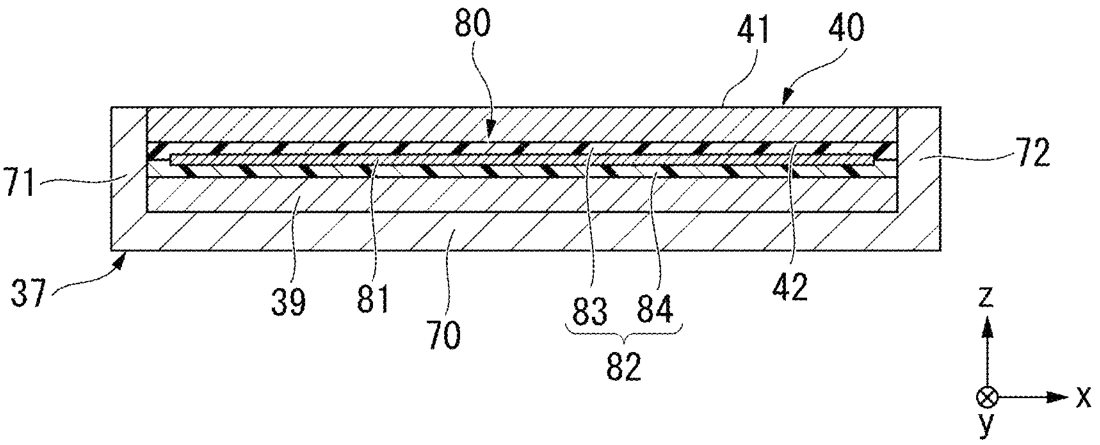
FIG. 9 is a cross-sectional view illustrating a part of a film unit according to a second embodiment.

The film unit 35 according to a second embodiment will be described with reference to FIG. 9. Aspects other than those described below can be considered the same as those of the first embodiment. FIG. 9 is a cross-sectional view showing a part of the film unit according to the second embodiment. In FIG. 9, depictions of the stay 38 and the tubular body 36 are omitted.

The second embodiment is different from the first embodiment in that the film unit 35 includes an auxiliary heat equalizing member 39 interposed between the heat equalizing member 80 and the base portion 70 of the support member 37. The auxiliary heat equalizing member 39 has a plate shape. The auxiliary heat equalizing member 39 is less likely to bend than the heat equalizing member 80. The auxiliary heat equalizing member 39 has thermal conductivity higher than that of the substrate 43 of the heater unit 40. The auxiliary heat equalizing member 39 can be formed of a metal material having high thermal conductivity such as copper or aluminum. The auxiliary heat equalizing member 39 has a rectangular shape corresponding to the heat equalizing member 80. The auxiliary heat equalizing member 39 is in contact with the heat equalizing member 80 and the support member 37.

In the second embodiment, the same effects as those of the first embodiment can be achieved. In addition, rigidity can be improved.

Third Embodiment

Figure 10:
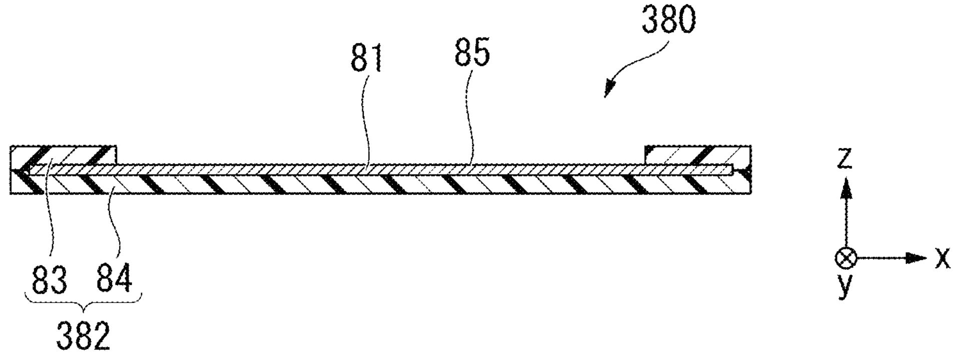
FIG. 10 illustrates a cross-sectional view of a heat equalizing member according to a third embodiment.
Figure 11:
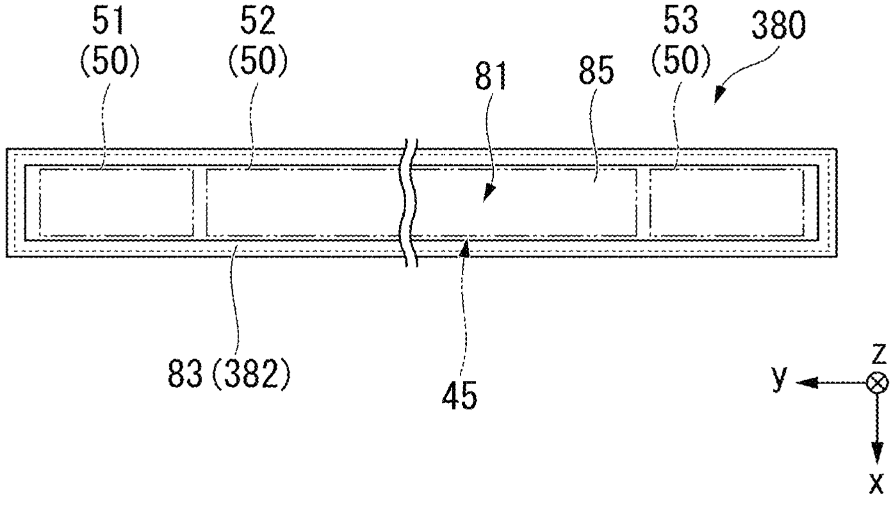
FIG. 11 illustrates a plan view of a heat equalizing member.

A heat equalizing member 380 according to a third embodiment will be described with reference to FIGS. 10 and 11. Aspects other than those described below can be considered the same as those of the first embodiment. FIG. 10 illustrates a cross-sectional view of the heat equalizing member according to the third embodiment. FIG. 11 illustrates a plan view of the heat equalizing member 380 according to the third embodiment. In FIG. 11, a position of the heating element set 45 with respect to the heat equalizing member 380 is indicated by dot-dash line.

The third embodiment is different from the first embodiment in that a protective member 382 covers only a part of the heat transfer sheet 81. The protective member 382 covers an entire −z direction surface of the heat transfer sheet 81, but just peripheral (outer edge) portions of the +z direction surface of the heat transfer sheet 81. The protective member 382 covers the outer edges of the heat transfer sheet 81 from both sides in the z direction. However, since the protective member 382 covers only the peripheral portions of the +z direction surface of the heat transfer sheet 81 there is an exposed portion 85 left exposed from the protective member 382 on the +z direction side. The exposed portion 85 is located at a central portion of the +z direction surface of the heat transfer sheet 81. The exposed portion 85 has a rectangular shape in the plan view. The exposed portion 85 can be in direct contact with the second surface 42 of the heater unit 40. The exposed portion 85 overlaps with the heating element set 45 in the plan view, but is larger in size than the heating element set 45 in both the x and y directions.

In the third embodiment, the same effects as those of the first embodiment can be achieved. In addition, since the heat transfer sheet 81 includes the exposed portion 85 for contact with the heater unit 40, heat exchange between the heater unit 40 and the heat transfer sheet 81 can be promoted by incorporation of the exposed portion 85. Therefore, the heat equalizing member 380 can more effectively equalize temperature distribution of the heater unit 40.

The entire surface of the heat equalizing member 380 on the side opposite to the exposed portion 85 is covered with the protective member 382. With this configuration, since heat is less likely to escape from the heat transfer sheet 81 to the support member 37, the heat can be more efficiently transferred from a high temperature portion to a low temperature portion of the heater unit 40 through the heat transfer sheet 81. Therefore, the heat equalizing member 380 can more effectively equalize the temperature distribution of the heater unit 40.

Since the protective member 382 covers the outer edges of the heat transfer sheet 81, the end edges of the heat transfer sheet 81 can be prevented from coming into direct contact with surrounding elements such as the support member 37 and thus being damaged.

Fourth Embodiment

Figure 12:
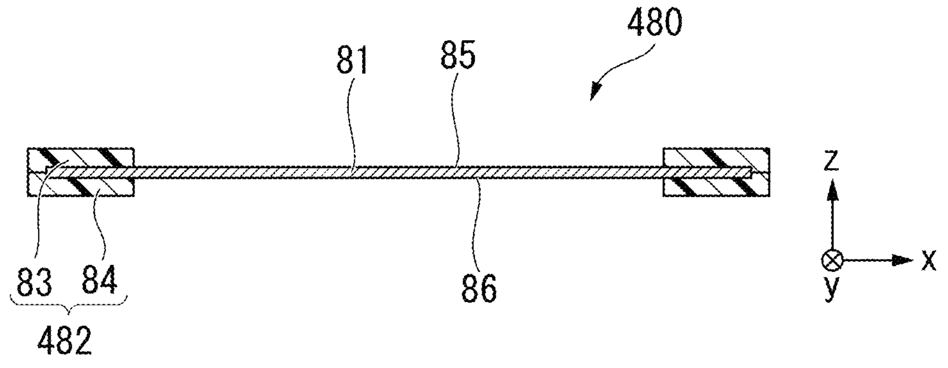
FIG. 12 illustrates a cross-sectional view of a heat equalizing member according to a fourth embodiment.

A heat equalizing member 480 according to a fourth embodiment will be described with reference to FIG. 12. Aspects other than those described below can be considered to be the same as those of the third embodiment. FIG. 12 illustrates a cross-sectional view of the heat equalizing member 480 according to the fourth embodiment.

The fourth embodiment is different from the third embodiment in that a protective member 482 covers only the peripheral portions of the −z direction surface of the heat transfer sheet 81. The protective member 482 covers all of the outer edges (peripheral portions) of the −z direction surface of the heat transfer sheet 81 and (like the third embodiment) all of the outer edges (peripheral portions of the +z direction surface of the heat transfer sheet 81. Since the protective member 482 covers just the peripheral portions of the −z direction surface of the heat transfer sheet 81, the heat transfer sheet 81 includes the exposed portion 86, which is left exposed by the protective member 482. The exposed portion 86 is located at a central portion of the −z direction surface of the heat transfer sheet 81. The exposed portion 86 has a rectangular shape in a plan view. The exposed portion 86 can come in contact with the temperature sensitive element 60.

In the fourth embodiment, the same effects as those of the third embodiment can be achieved. In addition, since the heat transfer sheet 81 has the exposed portion 86 permitting contact with the temperature sensitive element 60, detection sensitivity of the temperature sensitive element 60 can be improved, and a temperature of the heater unit 40 can be controlled more accurately.

Fifth Embodiment

Figure 13:
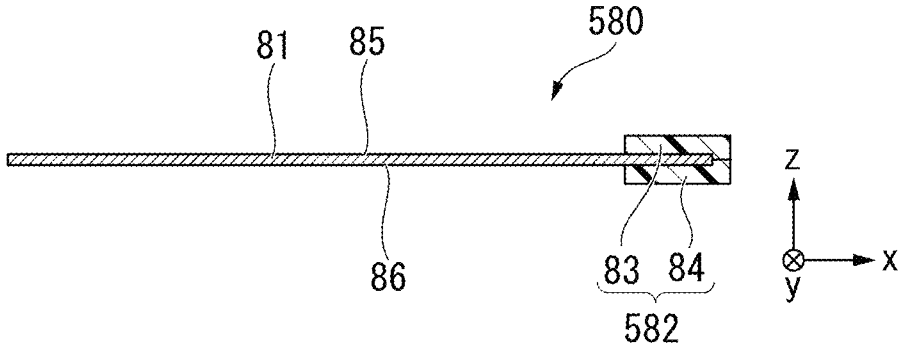
FIG. 13 illustrates a cross-sectional view of a heat equalizing member according to a fifth embodiment.
Figure 14:
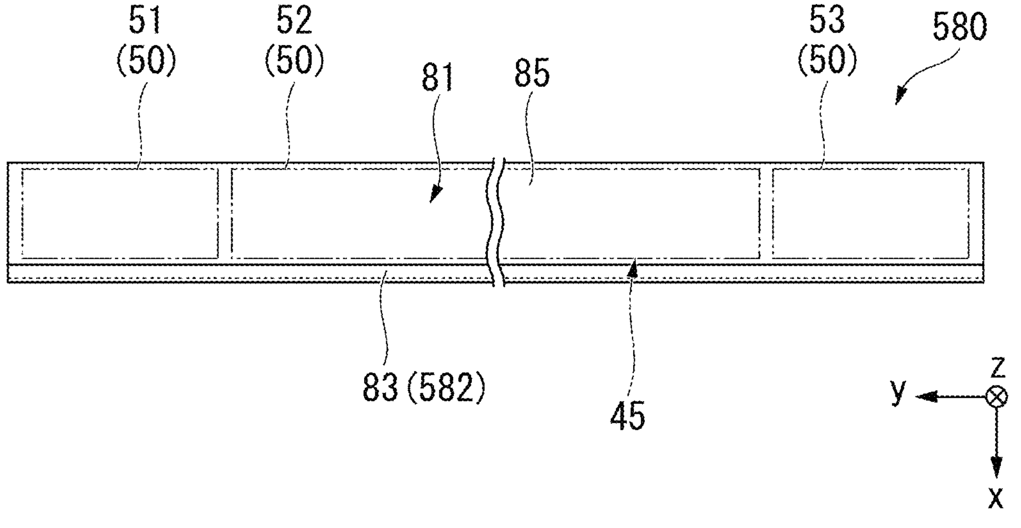
FIG. 14 illustrates a plan view of a heat equalizing member.

A heat equalizing member 580 according to a fifth embodiment will be described with reference to FIGS. 13 and 14. Aspects other than those described below can be considered the same as those of the fourth embodiment. FIG. 13 illustrates a cross-sectional view of the heat equalizing member according to the fifth embodiment. FIG. 14 illustrates a plan view of the heat equalizing member according to the fifth embodiment. In FIG. 14, a position of the heating element set 45 with respect to the heat equalizing member 580 is indicated by a dot-dash line.

The fifth embodiment is different from the fourth embodiment in that a protective member 582 covers only a part of the outer edges of the heat transfer sheet 81. The protective member 582 covers only an outer edge of the heat transfer sheet 81 at the +x direction end of the heat transfer sheet 81. The protective member 582 is on both the +z direction surface and the −z direction surface of the heat transfer sheet 81, but only near the +x direction end (edge). The protective member 582 covers the end of the heat transfer sheet 81 in the +x direction by covering the peripheral portion of the heat transfer sheet 81 from both z direction sides. The +x direction end is on a downstream side in the conveyance direction W of the sheet S. Since the protective member 582 covers only the peripheral portion of the heat transfer sheet 81 in the +x direction, the heat transfer sheet 81 includes an exposed portion 85 and an exposed portion 86 left exposed by the protective member 582. The protective member 582 protrudes beyond the heat transfer sheet 81 in the +x direction in the plan view. The y direction ends of the protective member 582 coincide with the ends of the heat transfer sheet 81. However, in other examples, the y direction ends of the protective member 582 may be located inside the y direction ends of the heat transfer sheet 81, or outside the y direction ends of the heat transfer sheet 81. The edge of the heat equalizing member 580 on the +x direction side is formed by the protective member 582.

In the fifth embodiment, the effects similar to those of the fourth embodiment can be achieved. In addition, since the protective member 582 covers only a part of the end edge of the heat transfer sheet 81, an area of the exposed portion 85 in contact with the heater unit 40 can be increased as compared with a configuration in which the protective member 582 covers all the outer edges of the heat transfer sheet 81. Therefore, the heat equalizing member 580 can more effectively equalize the temperature distribution of the heater unit 40.

In general, the heat equalizing member 580 receives a force in the +x direction via the heater unit 40 in accordance with rotation of the tubular body 36. When the heat equalizing member 580 receives the force in the +x direction, the end edge of the heat equalizing member 580 on the +x direction side may hit the downstream side wall portion 72 of the support member 37. Since the protective member 582 covers this edge of the heat transfer sheet 81, the heat transfer sheet 81 can be effectively prevented from hitting the support member 37 and being damaged.

Sixth Embodiment

Figure 15:
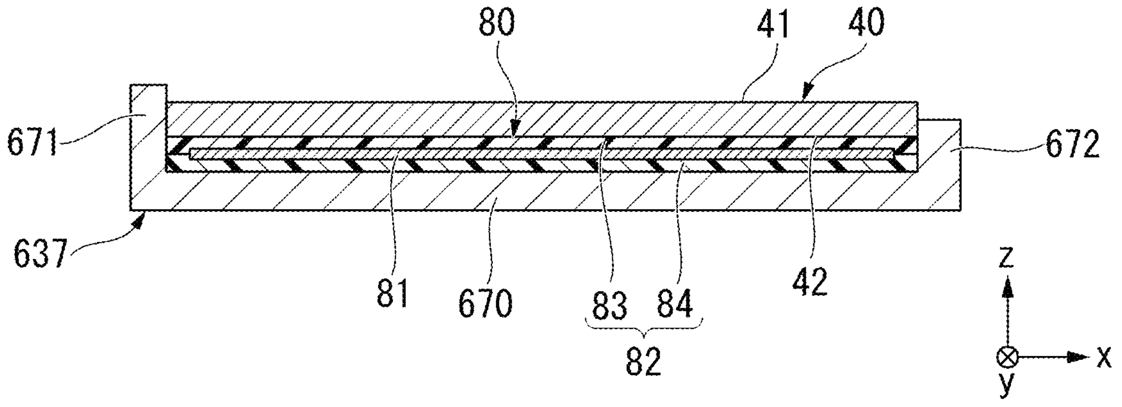
FIG. 15 is a cross-sectional view illustrating a part of a film unit according to a sixth embodiment.

A support member 637 according to a sixth embodiment will be described with reference to FIG. 15. Aspects other than those described below can be considered the same as those of the first embodiment. FIG. 15 is a cross-sectional view showing a part of a film unit according to the sixth embodiment. In FIG. 15, depictions of the stay 38 and the tubular body 36 are omitted.

The sixth embodiment is different from the first embodiment in that ends of an upstream side wall portion 671 and a downstream side wall portion 672 of the support member 637 are located at different positions (heights) along the z direction. The +z direction end of the upstream side wall portion 671 is located higher (in the z direction) than the +z direction end of the downstream side wall portion 672. The +z direction is on the center rc side of the pressure roller 31. The end of the upstream side wall portion 671 in the +z direction is located in the +z direction from the first surface 41 of the heater unit 40. The end of the downstream side wall portion 672 in the +z direction is located in the −z direction with respect to the first surface 41 of the heater unit 40. However, the end of the downstream side wall portion 672 in the +z direction may be located at the same position as the first surface 41 of the heater unit 40 in the z direction.

In the sixth embodiment, the same effects as those of the first embodiment can be achieved. In addition, pressure of the pressure roller 31 applied to the upstream side wall portion 671 becomes larger than pressure of the pressure roller 31 applied to the downstream side wall portion 672. In exchange for the increase in the pressure of the pressure roller 31 applied to the upstream side wall 671, pressure of the pressure roller 31 applied to a portion of the heater unit 40 adjacent to the upstream side wall portion 671 decreases. In contrast to a decrease in the pressure of the pressure roller 31 applied to the downstream side wall portion 672, pressure of the pressure roller 31 applied to a portion of the heater unit 40 adjacent to the downstream side wall portion 672 increases. Therefore, the pressure of the pressure roller 31 applied to the heater unit 40 increases toward the downstream side in the conveyance direction W of the sheet S. Due to this pressure distribution, the heater unit 40 is more difficult to move by movement of the tubular body 36, whereby the heat transfer sheet 81 can be prevented from sliding on the support member 637 and being worn.

Seventh Embodiment

Figure 16:
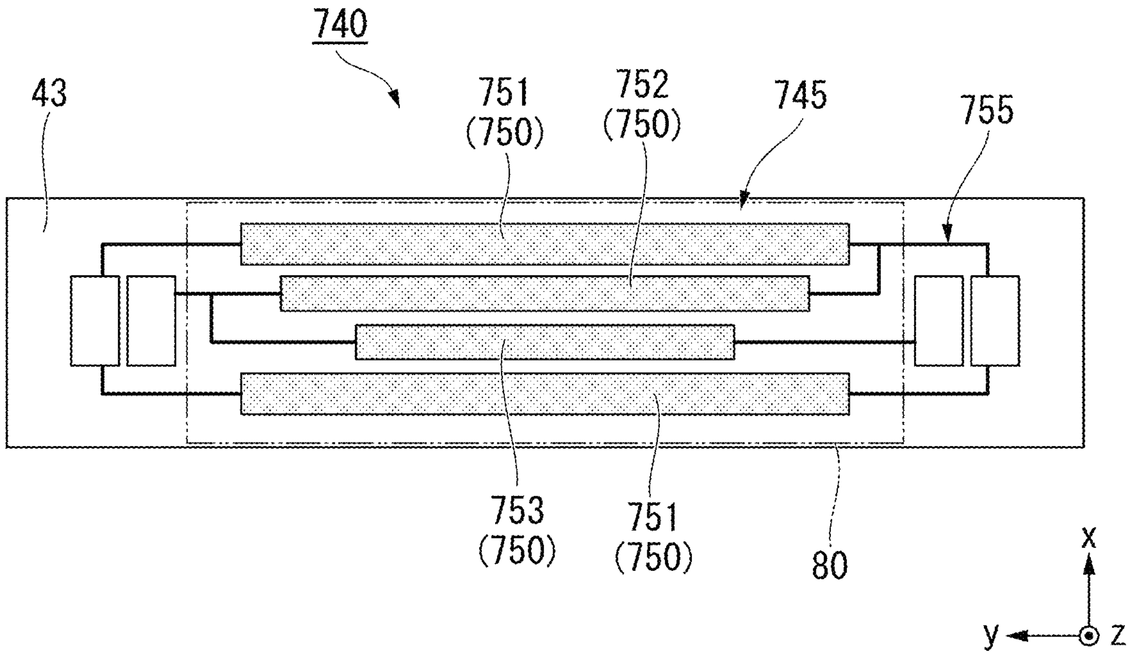
FIG. 16 illustrates a bottom view of a heater unit according to a seventh embodiment.

A heater unit 740 according to a seventh embodiment will be described with reference to FIG. 16. Aspects other than those described below can be considered the same as those of the first embodiment. FIG. 16 illustrates a bottom view of the heater unit according to the seventh embodiment.

In the seventh embodiment, arrangements of heating elements 750 of the heater unit 740 are different from those of the first embodiment. The heater unit 740 includes the substrate 43, a heating element set 745, and a wiring set 755.

The heating element set 745 is disposed on the substrate 43. However, the outer shape of the entire heating element set 745 can be considered to be formed in a rectangular shape having a longitudinal direction in the y direction and a lateral direction in the x direction.

The heating element set 745 includes a plurality of heating elements 750. The heating elements 750 include a pair of first heating elements 751, a second heating element 752, and a third heating element 753. The plurality of heating elements 750 are disposed in an order of one first heating element 751, the second heating element 752, the third heating element 753, and the other first heating element 751 along the x direction. A longitudinal direction of each of the heating elements 750 is the y direction. Each of the heating elements 750 has a length corresponding to various sheet widths of, for example, standard sizes of paper or the like. The second heating element 752 is shorter than the first heating element 751 in the y direction. Ends of the second heating element 752 in the y direction are located inside ends of the first heating element 751 in the y direction. The third heating element 753 is shorter than the second heating element 752 in the y direction. Ends of the third heating element 753 in the y direction are located inside the ends of the second heating element 752 in the y direction. Wiring of the wiring set 755 is connected to each of the heating elements 750. The heating element set 745 generates heat by being energized via the wiring set 755. The control unit 6 causes the corresponding heating element 750 to generate heat in accordance with a width of the sheet S passing therethrough.

In the seventh embodiment described above, by providing the heat equalizing member 80 including the heat transfer sheet 81 and the protective member 82, substantially the same effects as those described for the first embodiment can also be achieved. In this case, the heat transfer sheet 81 preferably has the following configuration similar to the first embodiment. The heat transfer sheet 81 has a rectangular shape having a longitudinal direction in the y direction and a lateral direction in the x direction. Both ends of the heat transfer sheet 81 in the x direction are located outwardly in the x direction of the ends of the heating element set 745 in the x direction. Both ends of the heat transfer sheet 81 in the y direction are located outwardly in the y direction of the ends of the heating element set 745 in the y direction. The heat transfer sheet 81 overlaps with the entire heating element set in a plan view.

Eighth Embodiment

Figure 17:
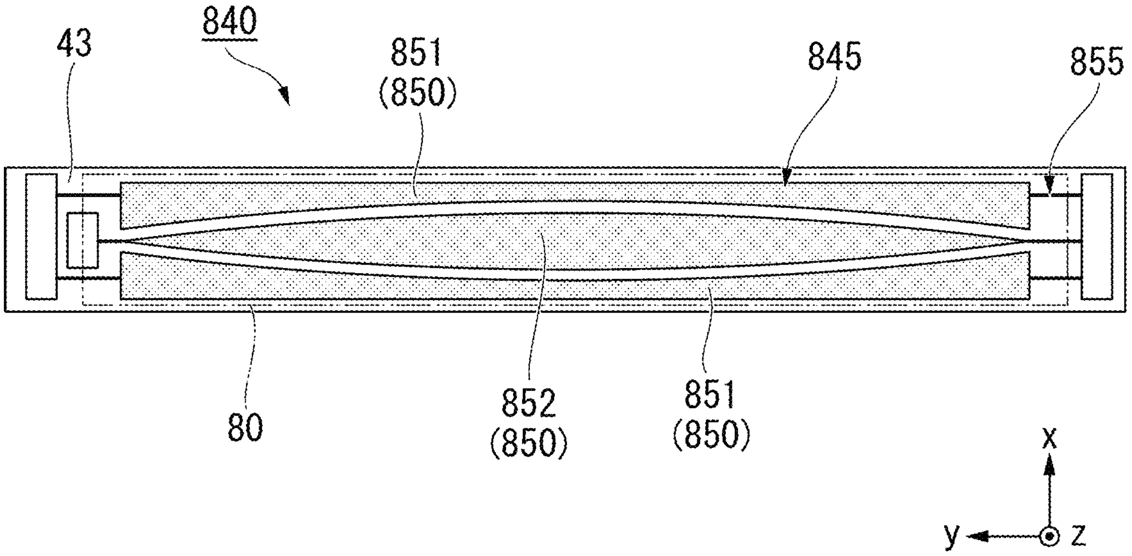
FIG. 17 illustrates a bottom view of a heater unit according to an eighth embodiment.

A heater unit 840 according to an eighth embodiment will be described with reference to FIG. 17. Aspects other than those described below can be considered the same as those of the first embodiment. FIG. 17 illustrates a bottom view of the heater unit according to the eighth embodiment.

In the eighth embodiment, arrangements of heating elements 850 of the heater unit 840 are different from those of the first embodiment. The heater unit 840 includes the substrate 43, a heating element set 845, and a wiring set 855.

The heating element set 845 is disposed on the substrate 43. However, an outer shape of the heating element set 845 can still be considered to be formed in a rectangular shape having a longitudinal direction in the y direction and a lateral direction in the x direction.

The heating element set 845 includes the plurality of heating elements 850. The heating elements 850 include a pair of first heating elements 851 and a second heating element 852. The plurality of heating elements 850 are disposed in an order of one first heating element 851, the second heating element 852, and the other first heating element 851 in the x direction. A longitudinal direction of each of the heating elements 850 is the y direction. The first heating element 851 gets thicker (wider in the x direction) at the end portions in the y direction. of the ends of the pair of first heating elements 851 are located at substantially the same positions as one another in the y direction. The second heating element 852 gets thinner (narrower in the y direction) from the center towards the end portions in the y direction. The y direction ends of the second heating element 852 are located at substantially the same positions as the ends of each of the first heating elements 851.

Wiring of the wiring set 855 is connected to each of the heating elements 850. The heating element set 845 generates heat by being energized via the wiring set 855. The control unit 6 causes the corresponding heating element 850 to generate heat in accordance with a width of the sheet S passing therethrough. When only the first heating element 851 generates heat, an amount of the heat generated by the heating element set 845 decreases from the center toward the end portions in the y direction. On the other hand, when the first heating element 851 and the second heating element 852 generate heat at the same time, the amount of the heat generated by the heating element set 845 is averaged over an entire length in the y direction as compared with the case where only the first heating element 851 generates the heat. Therefore, when the sheet S having a relatively small width passes, the control unit 6 energizes only the first heating element 851. When the sheet S having a relatively large width passes, the control unit 6 energizes the first heating element 851 and the second heating element 852.

In the eighth embodiment, by providing a heat equalizing member 80 including the heat transfer sheet 81 and the protective member 82, substantially the same effects as those of the first embodiment can also be achieved. In this case, the heat transfer sheet 81 preferably has the following configuration as in the first embodiment. The heat transfer sheet 81 has a rectangular shape having a longitudinal direction in the y direction and a lateral direction in the x direction. Ends of the heat transfer sheet 81 in the x direction are located outwardly in the x direction of the ends of the heating element set 845 in the x direction. Ends of the heat transfer sheet 81 in the y direction are located outwardly in the y direction of the ends of the heating element set 845 in the y direction. The heat transfer sheet 81 overlaps with the entire heating element set 845 in a plan view.

In an embodiment, the protective member 82 covers the heat transfer sheet 81 on both of the sides (the +z direction and the −z direction sides), but the embodiments are not limited to this. In some embodiments, a protective member may cover the heat transfer sheet 81 from only one of the +z direction and the −z direction sides.

In an embodiment, the heat transfer sheet 81 is a graphite sheet, but is not limited to this. The heat transfer sheet 81 may be formed of a metal material. In this case, the heat transfer sheet 81 is preferably formed of a metal material having relatively high thermal conductivity such as copper or aluminum.

In an embodiment, the first surface 41 of the heater unit 40 is in contact with the inner surface of the tubular body 36, but in other examples another heat equalizing member may be interposed between the first surface of the heater unit 40 and the inner peripheral surface of the tubular body 36.

The portion of the heat transfer sheet 81 covered with a protective member is not limited to the above embodiments. If the protective member covers at least some part of an edge of the heat transfer sheet 81, the similar effects as those described for the above embodiments can be achieved.

According to certain embodiments, since a heat equalizing member includes a protective member covering a heat transfer sheet, even when the heat transfer sheet is moved by the rotation of a tubular body, the heat transfer sheet can be prevented from coming into contact with a support member and becoming worn over time.

While certain embodiments have been described these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and equivalents are intended to cover such forms or modifications as would fall within the scope and spirit of the invention.

What is claimed is:

1. A fixing device, comprising:
- a tubular body;
- a heater unit inside the tubular body and having a longitudinal direction parallel to an axial direction of the tubular body, a first surface side of the heater unit contacting the tubular body;
- a heat equalizing member on a second surface side of the heater unit, the heater unit being between the heat equalizing member and the tubular body, the heat equalizing member including a heat transfer sheet and a protective resin on both sides of the heat transfer sheet;
- a support member configured to hold the heat equalizing member and the heater unit, the heat equalizing member being between the support member and the second surface side of the heater unit; and
- an auxiliary heat equalizing member between the support member and the heat equalizing member, wherein
- the auxiliary heat equalizing member directly contacts the support member and the heat equalizing member,
- the auxiliary heat equalizing member has a thermal conductivity that is higher than that of the heater unit,
- the heat transfer sheet has a thermal conductivity higher than that of the heater unit, and
- the auxiliary heat equalizing member has thermal conductivity higher than that of the heat transfer sheet.

2. The fixing device according to claim 1, wherein the heat equalizing member has a planar shape matching a planar shape of the auxiliary heat equalizing member.

3. The fixing device according to claim 1, wherein the auxiliary heat equalizing member is more rigid than the heat equalizing member.

4. The fixing device according to claim 1, wherein
- the heat transfer sheet is a graphite sheet, and
- the auxiliary heat equalizing member is a metal.

5. The fixing device according to claim 1, wherein the auxiliary heat equalizing member is aluminum.

6. The fixing device according to claim 1, wherein the auxiliary heat equalizing member is a metal.

7. The fixing device according to claim 1, wherein the support member includes:
- a base portion directly contacting the auxiliary heat equalizing member, and
- a side portion extending from the base portion and directly contacting an end portion of the auxiliary heat equalizing member, an end portion of the heat equalizing member, and an end portion of the heater unit.

8. The fixing device according to claim 1, wherein the support member includes side portions extending from a base portion for different distances, the side portions directly contacting end portions of the auxiliary heat equalizing member, the heat equalizing member, and the heater unit.

9. The fixing device according to claim 8, wherein the protective resin covers at least an end portion of the heat transfer sheet to be between the end portion of the heat transfer sheet and the support in a direction parallel to a plane of the heat transfer sheet.

10. The fixing device according to claim 1, wherein the heater unit comprises a substrate and a plurality of heating elements on the substrate.

11. The fixing device according to claim 1, wherein the heat transfer sheet comprises a graphite sheet and the protective resin directly contacts both sides of the graphite sheet.

12. An image processing apparatus, comprising:

an image forming unit configured to form a toner image on a sheet; and a fixing device configured to fix the toner image to the sheet, the fixing device including:

a tubular body;

a heater unit inside the tubular body and having a longitudinal direction parallel to an axial direction of the tubular body, a first surface side of the heater unit contacting the tubular body;

a heat equalizing member on a second surface side of the heater unit, the heater unit being between the heat equalizing member and the tubular body, the heat equalizing member including a heat transfer sheet and a protective resin on both sides of the heat transfer sheet;

a support member configured to hold the heat equalizing member and the heater unit, the heat equalizing member being between the support member and the second surface side of the heater unit; and an auxiliary heat equalizing member between the support member and the heat equalizing member, wherein the auxiliary heat equalizing member directly contacts the support member and the heat equalizing member, the auxiliary heat equalizing member has a thermal conductivity that is higher than that of the heater unit, the heat transfer sheet has a thermal conductivity higher than that of the heater unit, and the auxiliary heat equalizing member has thermal conductivity higher than that of the heat transfer sheet.

13. The image processing apparatus according to claim 12, wherein the heat equalizing member has a planar shape matching a planar shape of the auxiliary heat equalizing member.

14. The image processing apparatus according to claim 12, wherein the auxiliary heat equalizing member is more rigid than the heat equalizing member.

15. The image processing apparatus according to claim 12, wherein the heat transfer sheet is a graphite sheet, the protective resin is a polyamide resin, and the auxiliary heat equalizing member is a metal.

16. A fixing device, comprising:

a heater inside a tubular body and having a longitudinal direction parallel to an axial direction of the tubular body, a first surface side of the heater contacting the tubular body, the heater comprising a substrate and a plurality of heating elements on the substrate;

a heat equalizing member on a second surface side of the heater, the heater being between the heat equalizing member and the tubular body, the heat equalizing member including a heat transfer sheet and a protective resin layer on both sides of the heat transfer sheet;

a support configured to hold the heat equalizing member and the heater, the heat equalizing member being between the support and the second surface side of the heater; and an auxiliary heat equalizing member between the support and the heat equalizing member, wherein the auxiliary heat equalizing member directly contacts the support and the heat equalizing member, the auxiliary heat equalizing member has a thermal conductivity that is higher than the substrate of the heater, the heat transfer sheet has a thermal conductivity higher than the substrate of the heater, and the auxiliary heat equalizing member has thermal conductivity higher than that of the heat transfer sheet.

17. The fixing device according to claim 16, wherein the heat equalizing member has a planar shape matching a planar shape of the auxiliary heat equalizing member.

18. The fixing device according to claim 16, wherein the auxiliary heat equalizing member is more rigid than the heat equalizing member.

19. The fixing device according to claim 16, wherein the heat transfer sheet is a graphite sheet, and the auxiliary heat equalizing member is a metal.

20. The fixing device according to claim 19, wherein the protective resin layer is one of a polyamide or a fluorine resin.

* * * * *